United States Patent
Prinz et al.

(10) Patent No.: US 7,534,033 B2
(45) Date of Patent: May 19, 2009

(54) METHOD AND DEVICE FOR CHECKING TEMPERATURE VALUES OF A TEMPERATURE SENSOR OF A COMBUSTION ENGINE

(75) Inventors: Oliver Prinz, Regensburg (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 155 days.

(21) Appl. No.: 11/792,543

(22) PCT Filed: Nov. 4, 2005

(86) PCT No.: PCT/EP2005/055772
§ 371 (c)(1),
(2), (4) Date: Jun. 7, 2007

(87) PCT Pub. No.: WO2006/061296
PCT Pub. Date: Jun. 15, 2006

(65) Prior Publication Data
US 2008/0019413 A1    Jan. 24, 2008

(30) Foreign Application Priority Data
Dec. 10, 2004    (DE) .................. 10 2004 059 685

(51) Int. Cl.
*G01N 3/60*    (2006.01)
(52) U.S. Cl. ............................. 374/144; 374/57; 374/1
(58) Field of Classification Search .............. 374/1, 374/57, 144
See application file for complete search history.

(56) References Cited

U.S. PATENT DOCUMENTS

| | | | | |
|---|---|---|---|---|
| 5,614,664 | A * | 3/1997 | Yamagishi | 73/114.38 |
| 6,463,892 | B1 * | 10/2002 | Russell | 123/41.15 |
| 6,684,154 | B2 * | 1/2004 | Isobe et al. | 701/114 |
| 2002/0002429 | A1 * | 1/2002 | Sugimura et al. | 701/29 |
| 2004/0168510 | A1 * | 9/2004 | Wakahara et al. | 73/118.1 |
| 2004/0184507 | A1 |  9/2004 | Tsukamoto et al. | |

FOREIGN PATENT DOCUMENTS

| | | |
|---|---|---|
| DE | 39 90 872 T1 | 7/1990 |
| DE | 101 20 968 C2 | 11/2002 |
| DE | 103 16 606 A1 | 11/2004 |
| EP | 1 273 781 A2 | 1/2003 |
| JP | 2000230453 A | 8/2000 |
| WO | WO 01/35065 A1 | 5/2001 |

\* cited by examiner

*Primary Examiner*—Andre J Allen
(74) *Attorney, Agent, or Firm*—King and Spalding LLP

(57) ABSTRACT

A method and device for checking temperature values of a temperature sensor of a combustion engine are provided. A first temperature actual value is recorded during a first length of time at an ending of the operation of the combustion engine. A second temperature actual value is recorded during a second length of time during an operating state reflecting the starting of the combustion engine. A turn-off length of time of the combustion engine is determined between the ending of the operation of and the subsequent starting of the operation of the combustion engine. In addition, a temperature set value is established based on the first temperature actual value and on the turn-off length of time. An error of the second temperature actual value is recognized based on the second temperature actual value and on the temperature set value.

13 Claims, 2 Drawing Sheets

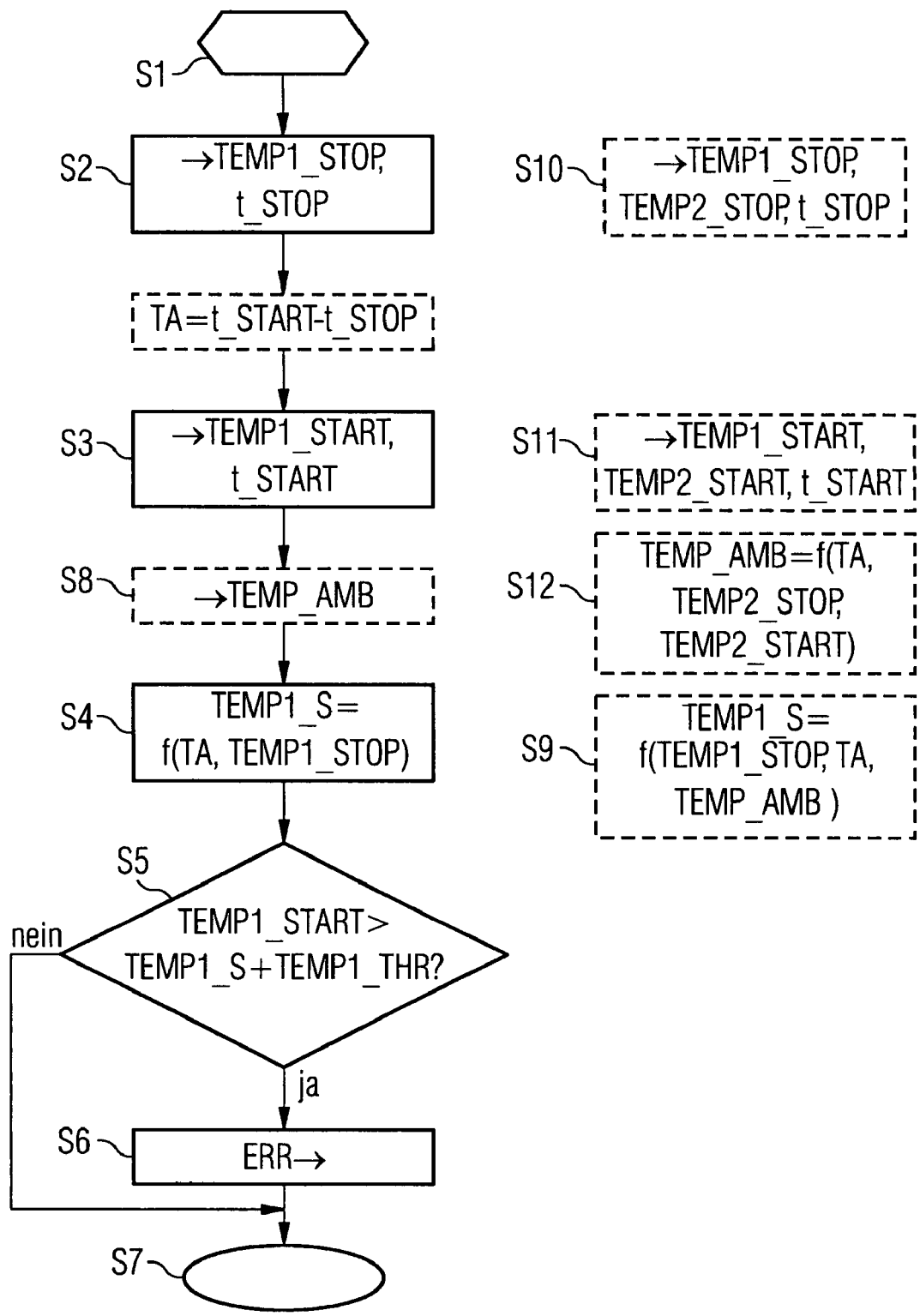

METHOD AND DEVICE FOR CHECKING TEMPERATURE VALUES OF A TEMPERATURE SENSOR OF A COMBUSTION ENGINE

CROSS REFERENCE TO RELATED APPLICATIONS

This application is the U.S. National Stage of International Application No. PCT/EP2005/055772 filed Nov. 4, 2005 and claims the benefit thereof. The International Application claims the benefits of German application No. 102004059685.9 DE filed Dec. 10, 2004, both of the applications are incorporated by reference herein in their entirety.

FIELD OF INVENTION

The invention relates to a method and a corresponding device for checking temperature values of a temperature sensor of a combustion engine.

BACKGROUND OF THE INVENTION

The requirements to be met by combustion engines, in particular in motor vehicles, are increasing due to the statutory regulations concerning pollutant emissions and because of customer wishes with regard to reliability, the efficient use of resources, in particular of fuel, and minimal maintenance costs. These requirements can only be met, if any malfunctions of vehicle components are reliably and accurately recognized and recorded, so that malfunctions can be compensated for or a repair of the defective vehicle components can be arranged. To this end, vehicle components, in particular all vehicle components pertinent to exhaust gas, such as, for example, a catalytic converter, a lambda sensor, a fuel system and a cooling system, are monitored. In particular, for the US American market, checking that temperature values of a coolant temperature sensor constantly remain within a given temperature range is specified for vehicles from the model year 2006 onwards, as incorrect coolant temperature sensor temperature values can result in increased raw emissions from the combustion engine, that is emissions without any exhaust treatment. The monitoring measures should ensure a low-polluting operation and maintain driving safety. This also means that when errors occur, it is ensured that the combustion engine switches to emergency operation and consequential damage can be avoided. If necessary the driver of the motor vehicle is informed of the malfunction, so that the driver can arrange a check and/or repair in a workshop. A control device of the combustion engine stores information about the errors that have occurred, such as, for example, the type of error, the location of the error and if necessary the operating conditions under which the malfunction occurred. This information can be evaluated in a workshop and in this way help in the repair work.

SUMMARY OF INVENTION

The object of the invention is to create a method and a corresponding device with which the temperature values of a temperature sensor can be checked.

The object is achieved by the features of the independent claims. Advantageous developments of the invention are identified in the subclaims.

The invention is characterized by a method and a corresponding device for checking temperature values of a temperature sensor of a combustion engine, wherein a first temperature actual value is recorded during a first predetermined time period when the operation of the combustion engine is coming to an end. A second temperature actual value is recorded during a second predetermined time period during an operating state reflecting the starting of the combustion engine. A shutdown time period of the combustion engine is determined between the ending of the operation of and the subsequent start of the operation of the combustion engine. In addition, a temperature set value is determined as a function of the first temperature actual value and of the shutdown time period. An error of the second temperature actual value is recognized as a function of the second temperature actual value and of the temperature set value.

The advantage is that the second temperature actual value can easily be compared with the temperature set value. The temperature set value can be determined in such a way that said temperature set value corresponds to an expected temperature of the combustion engine after the shutdown time period has expired. If the second temperature actual value deviates from the temperature set value, the error of the second temperature actual value can be easily recognized.

The first predetermined time period preferably comprises a time period during which the operation of the combustion engine warms it up, preferably to its operating temperature. The first temperature actual value is recorded preferably shortly before or after the operation of the combustion engine has ended, so that the first temperature actual value essentially corresponds to a temperature of the combustion engine when the operation of the combustion engine is coming to an end.

The second predetermined time period preferably comprises a time period during which the temperature of the combustion engine is not yet or only slightly warmed up by the current operation of the combustion engine, the second temperature actual value thus essentially corresponds to the temperature of the combustion engine when the operation of the combustion engine is started, which temperature value follows the end of the operation after the shutdown time period. The second temperature actual value is preferably recorded immediately after the start operating state, but can, however, also be recorded before the start operating state or during the start operating state.

In an advantageous embodiment of the invention the temperature set value is determined as a function of a first physical model of the cooling process of the combustion engine. The advantage is that the temperature set value can be determined exactly if a suitable physical model for the cooling process of the combustion engine is available.

In a further advantageous embodiment of the invention, the error of the second temperature actual value is recognized if the second temperature actual value exceeds the temperature set value by a predetermined amount or by a predetermined factor. This has the advantage that the error of the second temperature actual values can then also be reliably recognized, if for example environmental conditions have changed during the shutdown time period and result in the second temperature actual values deviating from the temperature set value. The predetermined amount or the predetermined factor can be accordingly suitably predetermined. By allowing a tolerance range predetermined using the predetermined amount or the predetermined factor, the recognition of the error of the second temperature actual value is resilient against changes in, for example, environmental conditions.

In a further advantageous embodiment of the invention, an ambient temperature value is determined within the second predetermined time period and the temperature set value is established as a function of the ambient temperature value.

The advantage is that the influence of the ambient temperature on the second temperature actual value is allowed for and the error of the second temperature actual value can be recognized with particular reliability. If the shutdown time period is so long that the combustion engine has essentially cooled down to the ambient temperature, then recognition of the error of the second temperature actual value can be particularly easy and reliable, if said second temperature actual value deviates considerably from the ambient temperature value.

In this connection, it is advantageous if an additional temperature sensor is used to determine the ambient temperature value. In this way the ambient temperature value can be determined particularly easily and accurately.

In a further advantageous embodiment of the invention, a third temperature actual value is recorded using the additional temperature sensor during the first predetermined time period. In addition, a fourth temperature actual value is recorded using the additional temperature sensor during the second predetermined time period. The ambient temperature value is determined as a function of the third temperature actual value, of the fourth temperature actual value and of the shutdown time period. The advantage is that the ambient temperature value can also be reliably determined if the additional temperature sensor is arranged in such a way that the third and the fourth temperature actual values are influenced by the temperature of the combustion engine and do not correspond to the ambient temperature. In addition, it is not necessary to have a separate temperature sensor just for recording the ambient temperature values.

In this connection, it is of advantage if the ambient temperature value is determined as a function of a second physical model of the cooling process of the combustion engine. The advantage is that the ambient temperature value can be determined accurately, if the second physical model of the cooling process of the combustion engine is suitably predetermined.

BRIEF DESCRIPTION OF THE DRAWINGS

Exemplary embodiments of the invention are explained below with reference to the schematic drawings, in which;

FIG. 3 shows a flow chart.

DETAILED DESCRIPTION OF INVENTION

Figure 1:
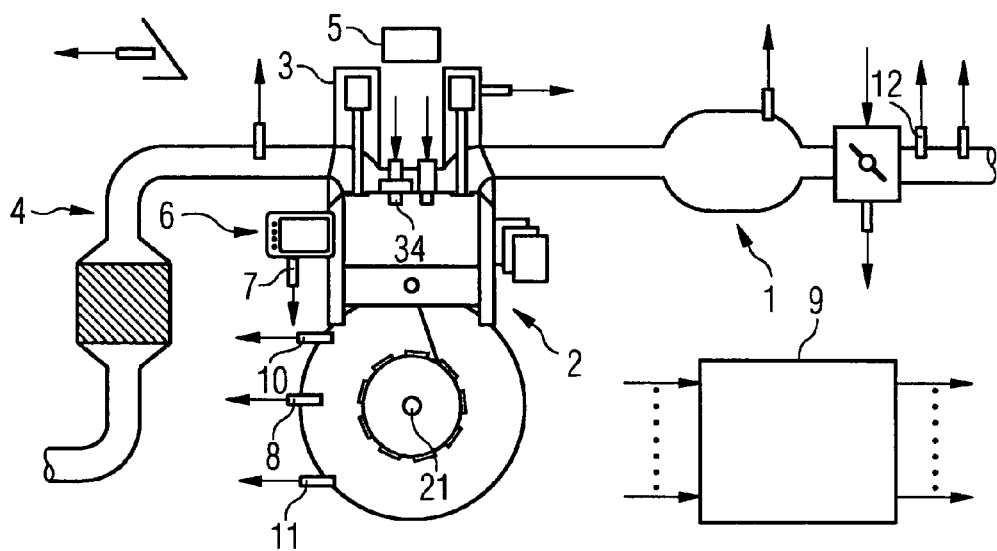
FIG. 1 shows a combustion engine with a control unit.

Elements having the same construction and function are identified in the figures with the same reference character throughout.

A combustion engine (FIG. 1) comprises an intake system 1, a motor unit 2, a cylinder head 3 and an exhaust system 4. The motor unit 2 comprises several cylinders, which have pistons and connecting rods, via which said pistons are coupled with a crankshaft 21. In addition, there is a feeding device 5 for fuel.

The cylinder head 3 comprises a valve train with a gas intake valve, a gas output valve and valve drives. The cylinder head 3 also comprises an injection valve 34 and a spark plug.

The motor unit 2 is designed in such a way that coolants, e.g. water with additives, flow through areas of said motor unit in a cooling circuit 6. The heat that arises during operation in the motor unit 2, is removed to a radiator, which is arranged in the cooling circuit outside of the motor unit 2 and preferably has air circulating round it. The heat removed from the combustion engine by means of the flowing coolant is released into the air. A coolant temperature sensor 7 is preferably provided, which records a coolant temperature value. The coolant temperature value is dependent on a temperature of the motor unit 2.

In addition, the combustion engine has a control device 9, which device can also be described as a device for checking temperature values of a temperature sensor of the combustion engine. The control device 9 is designed to execute programs that are stored in the control device 9 or in a memory that is linked to said control device. Sensors are assigned to control device 9, which sensors record the different measurement variables and determine the measured value of the measurement variables. The control device 9 determines actuating variables based on at least one of the measurement variables, which actuating variables are then translated into corresponding actuating signals for controlling actuating elements using corresponding actuators.

The sensors are, for example, a pedal position transducer, which records the position of an accelerator pedal, a crankshaft angle sensor 10, which records a crankshaft angle and to which a rotational speed is then assigned, a mass airflow sensor, the coolant temperature sensor 7, which records the coolant temperature value, an oil temperature sensor 8, which records an oil temperature value, a torque sensor 11 or an intake air temperature sensor 12. Depending on the embodiment of the invention, there can be any number desired of the sensors or also additional sensors.

The actuating elements can be designed, for example, as gas intake or gas outlet valves, as injection valves 34, spark plug or as a throttle valve.

The combustion engine also preferably has additional cylinders, to which corresponding actuating elements are then assigned.

Figure 2:
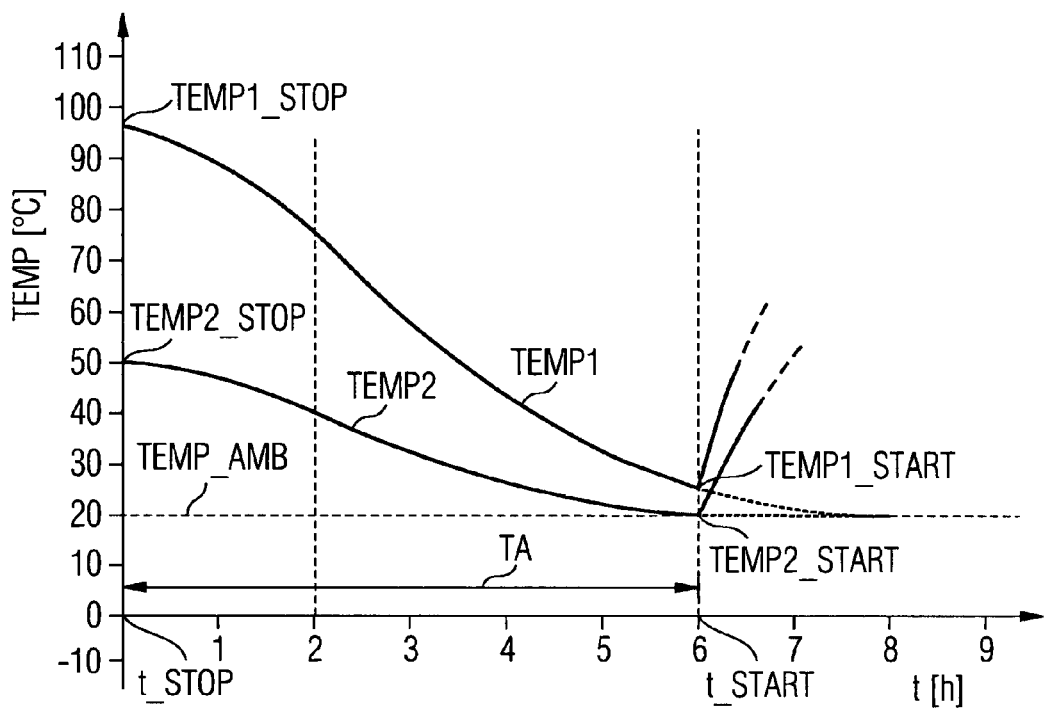
FIG. 2 shows a temperature-time chart of a cooling process of the combustion engine.

FIG. 2 shows a temperature-time chart with a first temperature curve TEMP1 and a second temperature curve TEMP2. The first temperature curve TEMP1 shows the course of, for example, the coolant temperature, which is recorded using the coolant temperature sensor 7. The first temperature curve TEMP1 can, however, also show, by way of example, the course of the oil temperature, which is recorded using the oil temperature sensors 8, or the course of temperatures that are recorded using a different temperature sensor of the combustion engine. The second temperature curve TEMP2 shows, by way of example, the course of an intake air temperature, which is recorded using the intake air temperature sensor 12.

The operation of the combustion engine is ended at a point in time t_STOP. The combustion engine then cools down during a shutdown time period TA, until the operation of the combustion engine is started again at a point in time t_START. The shutdown time period TA corresponds to a temporal difference between the point in time t_START and the point in time t_STOP. After, by way of example, eight hours, the combustion engine has more or less attained an ambient temperature, which can be recorded as an ambient temperature value TEMP_AMB. The time period after the expiry of which the combustion engine has more or less attained the ambient temperature, is, for example, dependent on the type and size of the combustion engine and on the temperature that said engine is at the point in time t_STOP.

A program for checking temperature values, the flow chart of which is represented in FIG. 3, is initiated in a step S1. Step S1 is preferably carried out when the operation of the combustion engine is coming to an end.

In a step S2, a first temperature actual value TEMP1_STOP is recorded and stored with the point in time t_STOP. The first temperature actual value TEMP1_STOP is recorded within a first predetermined time period when the operation of the combustion engine is coming to an end. During the first predetermined time period the temperature of the combustion engine essentially corresponds to its temperature at the point in time t_STOP. The first temperature actual value TEMP1_STOP can be recorded before or after the operation has ended, as long as the temperature of the combustion engine has not changed considerably compared to its temperature at the point in time t_STOP.

In a step S3, a second temperature actual value TEMP1_START and the point in time t_START are recorded. The second temperature actual value TEMP1_START is recorded within a second predetermined time period at the operating state reflecting the start of the combustion engine. During the second predetermined time period, the actual temperature of the combustion engine essentially corresponds to its temperature at the point in time t_START. The second temperature actual value TEMP1_START can be recorded before, after or during the operating state reflecting the start, as long as the actual temperature of the combustion engine has not changed considerably compared to its temperature at the point in time t_START or as long as the actual temperature of the combustion engine is still sufficiently distinguishable from the actual temperature of the combustion engine that the combustion engine had within the first predetermined time period.

In a step S4, a temperature set value TEMP1 S is determined as a function of the first temperature actual value TEMP1_STOP and of the shutdown time period TA. In a step S5, a check is carried out to determine the second temperature actual value TEMP1_START is greater than the sum of the temperature set value TEMP1 S and a predetermined temperature threshold value TEMP1_THR. If the condition is met, then, in a step S6, an error ERR is recognized and the program sequence is ended in a step S7. But if the condition in step S5 is not met, then the program sequence is ended in step S7.

The predetermined temperature threshold value TEMP1_THR is suitably set so that the error ERR can be recognized reliably. If the predetermined temperature threshold value TEMP1_THR is, for example 10° C., then the error ERR is recognized if the second temperature actual value TEMP1_START exceeds the temperature set value TEMP1_S by more than 10° C.

In addition, in a step S8, that is carried out, for example, between steps S3 and S4, the ambient temperature value TEMP_AMB can be recorded, using, for example, an additional temperature sensor, which is, for example, a separate temperature sensor for recording the ambient temperature value TEMP_AMB or the intake air temperature sensor. In this case, in a step S9, which replaces step S4, the temperature set value TEMP1_S can be determined as a function of the first temperature actual value TEMP1_STOP, of the shutdown time period TA and of the ambient temperature value TEMP_AMB. The ambient temperature value TEMP_AMB is preferably recorded within the second predetermined time period.

If the additional temperature sensor is arranged in such a way that the temperature values recorded using said sensor are based on the temperature of the combustion engine, then it is of advantage, for these temperature values too, to allow for the cooling down of the combustion engine. In an alternative embodiment, steps S2, S3 and S8 are replaced by steps S10, S11 and S12 respectively.

In step S10, which replaces step S2, a third temperature actual value TEMP2_STOP is recorded and stored in addition to the first temperature actual value TEMP1_STOP and to the point in time t_STOP. The third temperature actual value TEMP2_STOP is recorded by means of the additional temperature sensor within the first predetermined time period and corresponds, for example, to the intake air temperature at the point in time t_STOP.

In step S11, which replaces step S3, a fourth temperature actual value TEMP2_START is recorded in addition to the second temperature actual value TEMP1_START and to the point in time t_START. The fourth temperature actual value TEMP2_START is recorded by means of the additional temperature sensor within the second predetermined time period and corresponds, for example, to the intake air temperature at the point in time t START.

In step S12, which replaces step S8, the ambient temperature value TEMP_AMB is determined as a function of the third temperature actual value TEMP2_STOP, of the fourth temperature actual value TEMP2_START and of the shutdown time period TA. The ambient temperature value TEMP_AMB determined in this way is then taken into consideration in step S9 for the determination of the temperature set values TEMP1_S.

Preferably, the temperature set value TEMP1_S and/or the ambient temperature value TEMP_AMB are each determined based on a respective physical model of the cooling process of the combustion engine. The cooling down generally occurs in accordance with an exponential function with negative exponents. The temperature set value TEMP1_S at the point in time t_START can be determined for example according to the formula below:

$$TEMP1\_S = TEMP\_AMB + (TEMP1\_STOP - TEMP\_AMB) * \exp(-F1 * TA),$$

whereby F1 is a first predetermined factor, which is specific for the combustion engine. The first factor F1 is based on a first effective, exothermic surface A1, on a first effective volume V1, on a first heat transfer coefficient α1, on a first density r1 and on a first heat capacity c1 of the volume V1. The first predetermined factor F1 can be determined according to the formula $$F1 = (\alpha 1 * A1)/(r1 * c1 * V1)$$

The ambient temperature value TEMP_AMB can be determined according to the formula below:

$$TEMP\_AMB = (TEMP2\_START - TEMP2\_STOP * \exp(-F2*TA))/(1 - \exp(-F2*TA)).$$

F2 is a second predetermined factor, which is specific for the combustion engine, and is determined according to the formula below:

$$F2 = (\alpha 2 * A2)/(r2 * c2 * V2),$$

whereby A2 is a second effective, exothermic surface, V2 is a second effective volume, α2 is a second heat transfer coefficient, r2 is a second density and c2 is a second heat capacity of the volume V2.

The first predetermined factor F1 and the second predetermined factor F2 are based on the location where the temperature sensor and, as the case may be, the additional temperature sensor are arranged, and on the type and size of the combustion engine and are set accordingly. The first predetermined factor F1 and the second predetermined factor F2 are preferably determined in advance metrologically, for example on a test bench.

If the combustion engine is cooled during operation via the cooling circuit 6 and the cooling of the combustion engine is ended with the ending of the operation of the combustion engine, then, during a time period directly following the ending of the operation, the combustion engine may cool down more slowly than is given by the exponential function. The cooling down of the combustion engine according to the exponential function does not prevail until after this time period has expired, which time period can be, for example, two hours. The cooling down of the combustion engine during this time period is based on the type and size of the combustion engine and on the cooling circuit 6. Preferably, the temperature set value TEMP1 S and/or the ambient temperature value TEMP_AMB are determined according to the exponential function after the time period has expired. Thereby, preferably, allowance is made for the cooling down of the combustion engine during the time period.

If the shutdown time period TA is so long that the temperature of the combustion engine has dropped to the ambient temperature, for example, after about eight hours, then, this can be used to determine the ambient temperature value TEMP_AMB and/or to check the second temperature actual value TEMP1_START. The fourth temperature actual value TEMP2_START is then more or less equal to the ambient temperature value TEMP_AMB. The temperature set value TEMP1_S is then preferably also more or less equal to the ambient temperature value TEMP_AMB. Likewise the second temperature actual value TEMP1_START should be equal to the ambient temperature value TEMP_AMB, so that the error ERR of the second temperature actual value TEMP1_START can be recognized very easily, if the second temperature actual value TEMP1_START exceeds the temperature set value TEMP1 S, the ambient temperature value TEMP_AMB or the fourth temperature actual value TEMP2_START by, for example, more than 10° C. or by another predetermined amount or by a predetermined factor. It is then not necessary to determine the ambient temperature value TEMP_AMB and/or the temperature set value TEMP1_S as a function of the respective associated physical model.

The invention claimed is:

1. A method for checking temperature values of a temperature sensor of a combustion engine, comprising:
   recording a first temperature actual value during a first time period when the operation of the combustion engine is coming to an end;
   recording a second temperature actual value during a second time period during an operating state reflecting the start of the combustion engine;
   determining a shutdown time period of the combustion engine between the end of the operation and the subsequent start of the operation of the combustion engine;
   determining a temperature set value as a function of the first temperature actual value and of the shutdown time period; and
   recognizing an error of the second temperature actual value as a function of the second temperature actual value and on the temperature set value.

2. The method as claimed in claim 1, wherein the temperature set value is determined as a function of a first physical model of a cooling process of the combustion engine.

3. The method as claimed in claim 1, wherein the error of the second temperature actual value is recognized when the second temperature actual value exceeds the temperature set value by an amount or by a factor.

4. The method as claimed in claim 1, wherein an ambient temperature value is determined within the second time period and the temperature set value is determined based on the ambient temperature value.

5. The method as claimed in claim 4, wherein the ambient temperature value is determined via an additional temperature sensor.

6. The method as claimed in claim 5, further comprising:
   recording a third temperature actual value via the additional temperature sensor during the first time period;
   recording a fourth temperature actual value via the additional temperature sensor during the second predetermined time period; and
   determining the ambient temperature value as a function of the third temperature actual value, of the fourth temperature actual value and of the shutdown time period.

7. The method as claimed in claim 6, wherein the ambient temperature value is determined based on a second physical model of the cooling process of the combustion engine.

8. A device for checking temperature values of a temperature sensor of a combustion engine, comprising:
   a first temperature actual value recorded during a first predetermined time period when the operation of the combustion engine is coming to an end;
   a second temperature actual value recorded during a second predetermined time period during an operating state reflecting the start of the combustion engine;
   a shutdown time period of the combustion engine between the ending of the operation and the subsequent starting of the operation of the combustion engine is determined;
   a temperature set value determined based on the first temperature actual value and on the shutdown time period; and
   an error detector that uses the second temperature actual value as a function of the second temperature actual value and on the temperature set value in order to detect an error.

9. The device as claimed in claim 8, wherein the error of the second temperature actual value is recognized, when the second temperature actual value exceeds the temperature set value by an amount or by a factor.

10. The device as claimed in claim 8, wherein an ambient temperature value is determined within the second time period and the temperature set value is determined based on the ambient temperature value.

11. The device as claimed in claim 10, wherein the ambient temperature value is determined via an additional temperature sensor.

12. The device as claimed in claim 11, further comprising:
   a third temperature actual value recorded via the additional temperature sensor during the first time period; and
   a fourth temperature actual value recorded via the additional temperature sensor during the second predetermined time period,
   wherein the ambient temperature value is determined as a function of the third temperature actual value, of the fourth temperature actual value and of the shutdown time period.

13. The device as claimed in claim 11, wherein the ambient temperature value is determined based on a second physical model of the cooling process of the combustion engine.

* * * * *